United States Patent Office 2,997,176
Patented Aug. 22, 1961

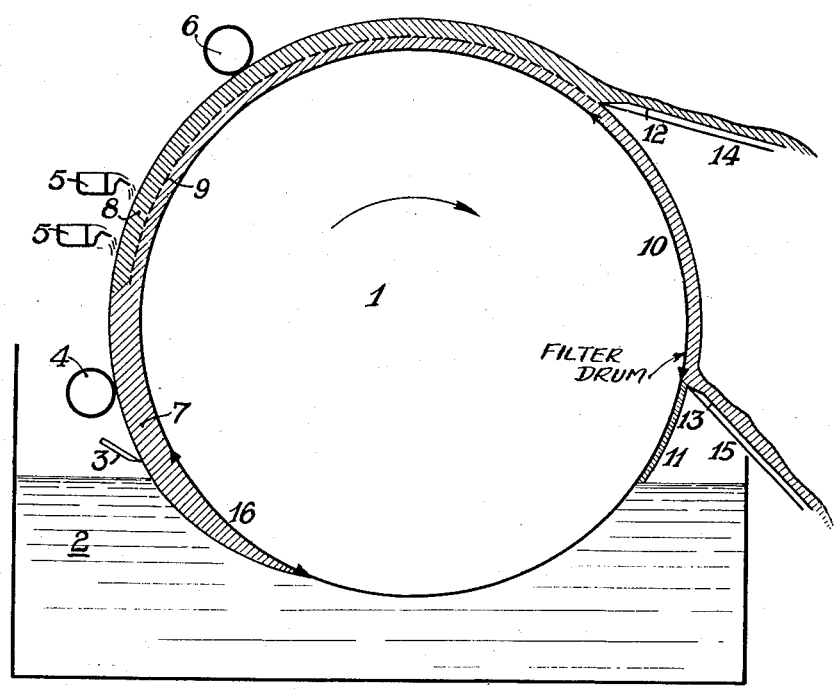

2,997,176
PROCESS AND DEVICE FOR THE REMOVAL OF A PRECIPITATE FROM A ROTARY FILTER
André Delmas, Dombasle-sur-Meurthe, France, assignor to Solvay & Cie, Brussels, Belgium, a Belgian company
Filed July 15, 1957, Ser. No. 671,922
Claims priority, application Belgium July 17, 1956
3 Claims. (Cl. 210—67)

The present invention is concerned with a process and a device for the removal of a precipitate deposited on a rotary filter in separate fractions, each of the fractions being intended for a distinct final manufacture.

It is known that rotary filters operating under vacuum generally comprise a perforated drum on which the filter cloth is arranged, the assembly being partially submerged in a trough containing the slurry to be filtered. By the action of the vacuum applied to the interior of the drum, the solid matter is deposited on the filter cloth and by the rotation of the drum the cake thus formed is removed from the trough. A scraping knife arranged slightly above the level of the liquid removes the excess precipitate and thus evens out the thickness of the cake which is moreover compressed during the final pressing by one or more rollers. The cake is then removed from the filter by means of an appropriately arranged knife. It is known that it is possible to wash the solid product while it is still on the filter; this operation having the aim of facilitating the elimination of the mother liquors which still permeate the cake, the residual mother liquors moving progressively from the external surface of the cake towards the filter cloth support.

The invention is based on the fact that the washing of the cake must in certain cases be relatively restricted on account of the solubility of the compounds which form the cake. The washing of the cake by limited quantities of liquid determines a rather special structure of the cake, the external layer being washed by "pure" liquid, whilst the internal layers are washed by a liquid which is more and more charged with impurities as it approaches the filter cloth. If the precipitate deposited on the filter serves as a starting product for several distinct manufactures which require a product of different purity, it is permissible according to the invention to withdraw the precipitate in such a manner as to meet the conditions for carrying out these manufactures.

According to the invention the precipitate deposited on a rotary filter is removed in successive layers, each of the layers removed serving for a distinct final production.

The process according to the invention is successfully applied to the filtration of sodium bicarbonate coming from apparatus for the carbonatation of ammoniacal brine. In this case the external layer of the precipitate which is more thoroughly washed serves for the manufacture of caustic soda by causticization or of refined sodium bicarbonate, while the internal and more thoroughly dried layer is used for the preparation of sodium carbonate. It is to be understood that this example is in no way limitative and that the process may be applied in the case of other precipitates without departing from the scope of the invention.

The single figure in the accompanying drawing illustrates by way of example a device for carrying out the process according to the invention.

The device comprises a rotary drum 1 on which the filter equipment is arranged, the trough 2 of the filter where the material to be filtered is charged, a knife 3 levelling out the layer, a compressor roller 4 levelling the thickness of the precipitate cake on the drum, the distribution cocks 5 for the wash liquor and the compressor roller 6. The device also comprises several knives two of which (12 and 13) are shown in the figure, these knives being extended by sliding pieces. These knives as well as the sliding pieces are made of stainless steel and the latter may, if desired, be covered by a protective coating such as a polyvinyl chloride coating. The characteristic feature of the device is thus the use of several knives, each knife successively removing a succeeding layer of the precipitate cake.

The device of the figure applied particularly but not limitatively to the filtration of sodium bicarbonate coming from apparatus for the carbonation of ammoniacal brine, operates as follows: The drum passing through the trough containing the sodium bicarbonate slurry is charged with precipitate along the arc 16. A cake of sodium bicarbonate 7 is formed on the drum; the surface of the cake is equalised by the equalizing knife 3 and compressed by the roller 4, the cake being subjected to reduced pressure. The cake then passes before the washing sprays 5 where it imbibes a limited quantity of water on account of the solubility of the sodium bicarbonate. Something like a "washing gradient" is formed, the external layer 8 being washed with pure water, whilst the underlying layers 9 are washed with water containing chlorine ions from the washing of the layer 8. The layer 8, being "better" washed, is suitable for the manufacture of caustic soda by causticization or of refined bicarbonate of great purity. For this purpose the moisture content is of no importance, since the precipitate is intended to be re-dissolved. After being subjected to a final compression by the roller 6, the layer 8 is thus removed by the knife 12 which is extended by the sliding pieces 14. The knife 12 is arranged as high as possible, the arrangement of this knife enabling a satisfactory separation of the layer 8 which is thus removed and then directed towards the de-bicarbonators or refiners. Since the layer 9 of sodium bicarbonate which remains on the filter continues to be subjected to the vacuum and its thickness is less than the initial thickness of the cake, the drying of this layer is therefore more complete and this layer is more particularly suitable for the manufacture of sodium carbonate, the moisture content having a great influence on the yield of the driers. The removal of the layer 9 is effected by the knife 13 extended by the sliding pieces 15. The knife 13 must be arranged as low as possible whilst being located above the surface of the liquid in the trough. By increasing the distance (10) between the knives 12 and 13, the drying period of the layer 9 is advantageously prolonged. After removal of the latter, the drum enters into the filter trough and is recharged along the arc 16.

I claim:

1. In a process of filtering a sodium bicarbonate slurry to separate sodium bicarbonate of varying purities therefrom, the steps which comprise applying a coating of sodium bicarbonate from said slurry to the surface of a rotary vacuum filter, said coating having a predetermined radial depth, water-washing said coating upon said surface after it has been withdrawn from said slurry, whereby the vacuum in said filter draws the wash water radially-inwardly through said coating, removing a first more-completely washed outer layer of said coating to a depth less than said predetermined depth, discharging said layer along a first path away from said filter, allowing the vacuum in said filter to act upon said coating after removing said first outer layer and before applying a further coating of sodium bicarbonate upon said filter, removing at least one second more completely dried successive radially-inner layer of said first-named coating underlying said first layer to a depth such that the sum of the depth of said first layer and the depth of said second layer is less than said predetermined depth, and discharging each second layer along a different second path different from said first path.

2. A process as defined in claim 1, wherein the first layer is transferred from said first path to the manufacture of caustic soda, and said second layer is transferred from a second path to the manufacture of anhydrous sodium carbonate.

3. A process as defined in claim 1, wherein the first layer is transferred from said first path to the manufacture of sodium bicarbonate, and said second layer is transferred from a second path to the manufacture of anhydrous sodium carbonate.

References Cited in the file of this patent

UNITED STATES PATENTS

| | | |
|---|---|---|
| 963,186 | Trump | July 5, 1910 |
| 2,083,887 | Wieneke | June 15, 1937 |
| 2,102,607 | Baker | Dec. 21, 1937 |
| 2,576,288 | Fink | Nov. 27, 1951 |

OTHER REFERENCES

Mellor: "Comprehensive Treatise On Inorganic and Theoretical Chemistry," volume 2, page 763, published by Longmans, Green & Co., New York, N.Y., 1922.